(12) United States Patent
Rothberg et al.

(10) Patent No.: US 11,120,197 B2
(45) Date of Patent: *Sep. 14, 2021

(54) OPTIMIZED RENDERING OF SHARED DOCUMENTS ON CLIENT DEVICES WITH DOCUMENT RASTER REPRESENTATIONS

(71) Applicant: Bluebeam, Inc., Pasadena, CA (US)

(72) Inventors: Jonathan Scott Rothberg, Pasadena, CA (US); Ryan Scott Weaver, Philadelphia, PA (US); Robert Pavil Kazimiroff, Pasadena, CA (US); Trent Michael Bramer, Pasadena, CA (US)

(73) Assignee: BLUEBEAM, INC., Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/525,937

(22) Filed: Jul. 30, 2019

(65) Prior Publication Data

US 2019/0354573 A1 Nov. 21, 2019

Related U.S. Application Data

(63) Continuation of application No. 14/447,502, filed on Jul. 30, 2014, now Pat. No. 10,402,472.

(51) Int. Cl.
*G06F 40/114* (2020.01)
*G06F 16/957* (2019.01)
(Continued)

(52) U.S. Cl.
CPC ........ *G06F 40/114* (2020.01); *G06F 16/9577* (2019.01); *G06F 40/103* (2020.01);
(Continued)

(58) Field of Classification Search
CPC .... G06F 40/114; G06F 40/169; G06F 40/106; G06F 40/103; G06F 16/9577; H04L 67/2823
See application file for complete search history.

(56) References Cited

U.S. PATENT DOCUMENTS

| 7,200,820 B1 | 4/2007 | Stephens |
| 8,019,897 B2 | 9/2011 | Buckley et al. |

(Continued)

FOREIGN PATENT DOCUMENTS

| JP | H07105353 A | 4/1995 |
| JP | 2006268488 A | 10/2006 |

(Continued)

OTHER PUBLICATIONS

Bickmore, T.W., et al., "Digestor: device-independent access to the World Wide Web" Computer Networks and ISDN Systems, North Holland Publishing, Amsterdam, NL; vol. 29, No. 8-113, Sep. 1, 1997, pp. 1075-1082.

*Primary Examiner* — Thu V Huynh
(74) *Attorney, Agent, or Firm* — Bookoff McAndrews, PLLC (57) ABSTRACT

Optimizing the rendering of a document stored on a collaboration server is disclosed. A request for the document is received from the client computer device. The document, which is defined by one or more sets of content data objects at least partially defining the visual appearance of the document, is transmitted to the client computer device in response to the request. The document also includes one or more supplemental document resource objects. One or more first sets of raster image data, each representative of a specific segment of the document, are transmitted to the client computer device. This is in response to the request, and based upon an evaluation of an identification of the client computer device included therein.

20 Claims, 6 Drawing Sheets

(51) Int. Cl.
*H04L 29/08* (2006.01)
*G06F 40/103* (2020.01)
*G06F 40/106* (2020.01)
*G06F 40/131* (2020.01)
*G06F 40/169* (2020.01)

(52) U.S. Cl.
CPC .......... *G06F 40/106* (2020.01); *G06F 40/131* (2020.01); *G06F 40/169* (2020.01); *H04L 67/2823* (2013.01)

(56) References Cited

U.S. PATENT DOCUMENTS

| | | | |
|---|---|---|---|
| 8,191,156 | B2 | 5/2012 | Kubo |
| 8,384,726 | B1* | 2/2013 | Grabowski ......... G06F 16/9577 |
| | | | 345/548 |
| 8,648,858 | B1 | 2/2014 | Swenson et al. |
| 8,738,826 | B2 | 5/2014 | Stahl et al. |
| 9,785,332 | B1 | 10/2017 | Karppanen |
| 2002/0010716 | A1* | 1/2002 | McCartney ......... G06F 16/9577 |
| | | | 715/236 |
| 2002/0015042 | A1 | 2/2002 | Robotham et al. |
| 2002/0027570 | A1 | 3/2002 | Muto et al. |
| 2002/0059335 | A1 | 5/2002 | Jelbert |
| 2002/0099739 | A1 | 7/2002 | Fischer |
| 2002/0112114 | A1 | 8/2002 | Blair et al. |
| 2003/0079179 | A1 | 4/2003 | Brown et al. |
| 2003/0233617 | A1 | 12/2003 | Hirai |
| 2004/0073873 | A1 | 4/2004 | Croney et al. |
| 2004/0103371 | A1* | 5/2004 | Chen ................... G06F 16/9577 |
| | | | 715/205 |
| 2005/0195221 | A1* | 9/2005 | Berger ................ G06F 3/04892 |
| | | | 345/660 |
| 2005/0210399 | A1* | 9/2005 | Filner ................... G06F 3/0481 |
| | | | 715/767 |
| 2006/0026513 | A1 | 2/2006 | Eschbach et al. |
| 2007/0263007 | A1 | 11/2007 | Robotham et al. |
| 2008/0222273 | A1 | 9/2008 | Lakshmanan et al. |
| 2010/0259781 | A1 | 10/2010 | Nguyen |
| 2011/0252082 | A1* | 10/2011 | Cobb ............... H04N 21/23109 |
| | | | 709/203 |
| 2012/0096342 | A1 | 4/2012 | Wang |
| 2012/0250048 | A1 | 10/2012 | Takaragi et al. |
| 2013/0073942 | A1 | 3/2013 | Cherkasov |
| 2014/0016162 | A1 | 1/2014 | Fukumori |
| 2014/0053054 | A1 | 2/2014 | Shen et al. |
| 2014/0304658 | A1 | 10/2014 | Larkina et al. |
| 2015/0012817 | A1 | 1/2015 | Redenbach et al. |

FOREIGN PATENT DOCUMENTS

| | | |
|---|---|---|
| JP | 2009086985 A | 4/2009 |
| JP | 2011209983 A | 10/2011 |
| JP | 2011248808 A | 12/2011 |

* cited by examiner

OPTIMIZED RENDERING OF SHARED DOCUMENTS ON CLIENT DEVICES WITH DOCUMENT RASTER REPRESENTATIONS

CROSS-REFERENCE TO RELATED APPLICATIONS

This application is a continuation of and claims the benefit of priority to U.S. application Ser. No. 14/447,502, filed on Jul. 30, 2014, the entirety of which is incorporated herein by reference.

STATEMENT RE: FEDERALLY SPONSORED RESEARCH/DEVELOPMENT

Not Applicable

BACKGROUND

1. Technical Field

The present disclosure relates generally to document sharing and collaboration, and more particularly, to optimizing the rendering of shared documents on client devices with document raster representations.

2. Related Art

The core of modern business is information, with its creation, distribution, and management being primary functions. Information or content can be presented in a variety of different ways, including word processing documents, spreadsheets, graphics, photographs, engineering drawings, architectural plans, and so forth. In electronic form, these are all generally referred to as documents, and may be generated by software applications that are specific thereto. A typical workflow in the enterprise involves various personnel collaborating to create, review, and/or edit such documents, and because of advancements in high-speed data communications and computing capabilities, these processes can involve remote personnel.

Due to the existence of many different computing platforms having a wide variety of operating systems, application programs, and processing and graphic display capabilities, it was recognized by those in the art that a device-independent, resolution-independent file format was necessary to facilitate such exchange. In response to this need, the Portable Document Format (PDF), amongst other competing formats, has been developed.

The PDF standard is a combination of a number of technologies, including a simplified PostScript interpreter subsystem, a font embedding subsystem, and a storage subsystem. As those in the art will recognize, PostScript is a page description language for generating the layout and the graphics of a document. Further, per the requirements of the PDF storage subsystem, all elements of the document, including text, vector graphics, and raster (bitmap) graphics, collectively referred to herein as graphic elements, are encapsulated into a single file. The graphic elements are not encoded to a specific operating system, software application, or hardware, but are designed to be rendered in the same manner regardless of the specificities relating to the system writing or reading such data. The cross-platform capability of PDF aided in its widespread adoption, and is now a de facto document exchange standard. Although originally proprietary, PDF has been released as an open standard published by the International Organization for Standardization (ISO) as ISO/IEC 3200-1:2008. Currently, PDF is utilized to encode a wide variety of document types, including those composed largely of text, and those composed largely of vector and raster graphics. Due to its versatility and universality, files in the PDF format are often preferred over more particularized file formats of specific applications. As such, documents are frequently converted to the PDF format.

From the user interface perspective, PDF documents are typically rendered statically, in which individual elements thereof such as text, pictures, and other elements are not editable. However, one of several improvements that have been made since the initial releases of PDF readers, writers, and the standard itself, is the support for adding annotations to a base document. Such annotations are graphically overlaid or "placed" on the underlying document, with placement being precisely controlled by the user. Thus, the functionality is similar to graphic illustration/design and image manipulation applications where various objects can be positioned on a document canvas by navigating a cursor to a desired location and providing a subsequent input to make placement permanent. Before positioning the cursor, the object to be placed, such as a geometric primitive, a text box, or the like, is selected.

Conventional implementations of the annotation feature are used to facilitate a linear workflow, where one user creates an initial version of a document, and distributes/emails the same to colleagues for review, comments, and amendments. Thereafter, upon receiving comments and amendments, the primary author incorporates them in to the document, and distributes it again in a second revision cycle. Not much more than a basic e-mail and computing infrastructure is required. Improvements to this iterative revision cycle have been developed to overcome challenges associated with additional participants, change in workflow hierarchy to many-to-many where participants carry on several concurrent revision dialogs, and so on. In particular, there are collaboration platforms where multiple users in scattered locations can edit documents in real-time, with a single authoritative version being maintained by a central server or cloud-based storage. Various PDF-specific collaboration platforms are also known in the art, including Bluebeam Studio.

Along with the increase in the number of participants in collaboration sessions comes the increase in the diversity of computing devices utilized by such participants. Numerous competing devices are available in different product categories, the selection of which is generally governed by the mobility requirements of the particular user. For example, the most mobile, yet smallest footprint (and hence smallest display and input device real estate) device is the smart phone. Slightly larger but with increased processing power are smart phone operating system-based tablets such as the Apple iPad, the Samsung Galaxy, and so on. Still larger and approaching the performance levels of conventional desktop and mobile (laptop) computers are intermediate devices such as Microsoft Surface Pro which run conventional desktop operating systems. Although there may be some performance compromises, all but the most demanding tasks can be completed with either desktop or mobile/laptop computers. In a collaborative environment, each of the participants may have different computing needs that can be fulfilled with one device or the other. Furthermore, with a mobile and ever-available workforce, the particular device a given participant may be utilizing often depends on time and location.

Rendering PDF documents in desktop or mobile/laptop computers, and even intermediate tablet-computer devices, is usually a trivial matter. PDF documents are comprised of text streams and vector and/or raster graphics data arranged as described in the PostScript page description language. The data in the PDF file must be interpreted for rendering, so some degree of processing is required. This processing can be completed with a minimal burden computing resources on conventional desktop computer systems and other devices of similar capability. However, the time required to perform the same tasks on less powerful devices such as tablets can be significantly delayed, leaving some regions of the document blank for extended periods of time as the limited processor attempts to render those portions.

Accordingly, there is a need in the art for optimizing the rendering of documents, particularly shared ones, over multiple client devices. There is also a need for improving the presentation of documents on tablets and other devices with comparatively lower processing capabilities such that delays are minimized.

BRIEF SUMMARY

The present disclosure is directed to optimizing the rendering of a document on different computer devices. It is contemplated that a user on the desktop computer system is able to annotate a shared document, and another user to do the same from a tablet device. The desktop computer system will have a document optimized therefor, and the tablet will have a document similarly optimized therefor.

One embodiment of the present disclosure is directed to a method for presenting a document stored on a collaboration server to a client computer device. The method may include receiving a request for the document from the client computer device. Additionally, the method may include transmitting the document to the client computer device in response to the request. The document may be defined by one or more sets of content data objects at least partially defining the visual appearance of the document. The document may also include one or more supplemental document resource objects. The method may also include selectively transmitting one or more first sets of raster image data to the client computer device in response to the request and an evaluation of an identification of the client computer device included therein. Each of the one or more first sets of raster image data may be representative of a specific segment of the document.

Another embodiment is directed to a method for optimizing the presentation of a document on multiple clients, in which the document is stored on a server. The method may include receiving a request for the document on the server from a first client and a second client. The request may include an identification of the respective one of the first client and the second client, and the document may be defined by one or more sets of content data objects at least partially defining the visual appearance of the document. The document can also include one or more supplemental document resource objects.

The method may further include a step of transmitting the document to the first client from the server in response to the request. An evaluation of the identification of the first client may also serve as the basis for transmitting the document to the first client. There may be a step of transmitting the document and one or more first sets of raster image data to the second client in response to the request. Each of the one or more first sets of raster image data being representative of a specific segment of the document. An evaluation of the identification of the second client may also be the basis for performing this step.

The method may further include rendering the document on a display of the first client. This may encompass rendering the one or more sets of content data objects and one or more supplemental document resource objects. Along these lines, there may be a step of generating a view of the one or more first sets of raster image data on a display of the second client, followed by overlaying the one or more supplemental document resource objects extracted from the document on the view of the one or more first sets of raster image data.

In another embodiment, a method for rendering a document on a client computer device is contemplated. The method may include a step of transmitting a request for the document from the client computer device to a remote system on which the document is stored. Then, there may be a step of receiving the document on the client computer device. The document may be defined by one or more sets of content data objects at least partially defining the visual appearance of the document. Additionally, the document may include one or more supplemental document resource objects each having a document location attribute. The method may also include receiving one or more first sets of raster image data on the client computer device. Each of the one or more first sets of raster image data may be representative of a specific segment of the document and having a first predefined resolution. There may be a step of extracting the one or more supplemental document resource objects from the document. Furthermore, there may be a step of generating a view of the one or more first sets of raster image data on a display of the client computer device, as well as overlaying the one or more supplemental document resource objects extracted from the document on the view of the one or more first sets of raster image data. The one or more supplemental data resource objects may be positioned according to corresponding document location attributes thereof.

These methods may be implemented as one or more programs of instructions executable by the client computer device as well as the remote system and tangibly embodied in a non-transitory program storage medium. The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

DETAILED DESCRIPTION

The present disclosure is directed to the optimized rendering of a shared document on different client devices. To this end, various methods for rendering a document on a client computer device, presenting a document stored on a collaboration platform to the client computer device, and optimizing the presentation of the document on multiple client computer devices are contemplated. It is understood that these methods may be implemented as one or more computer-executable instructions that can be stored on a non-transitory data storage medium.

The detailed description set forth below in connection with the appended drawings is intended as a description of certain embodiments of these methods, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as top and bottom, first and second, and the like are used solely to distinguish one entity from another without necessarily requiring or implying any actual such relationship or order between such entities.

Figure 1:
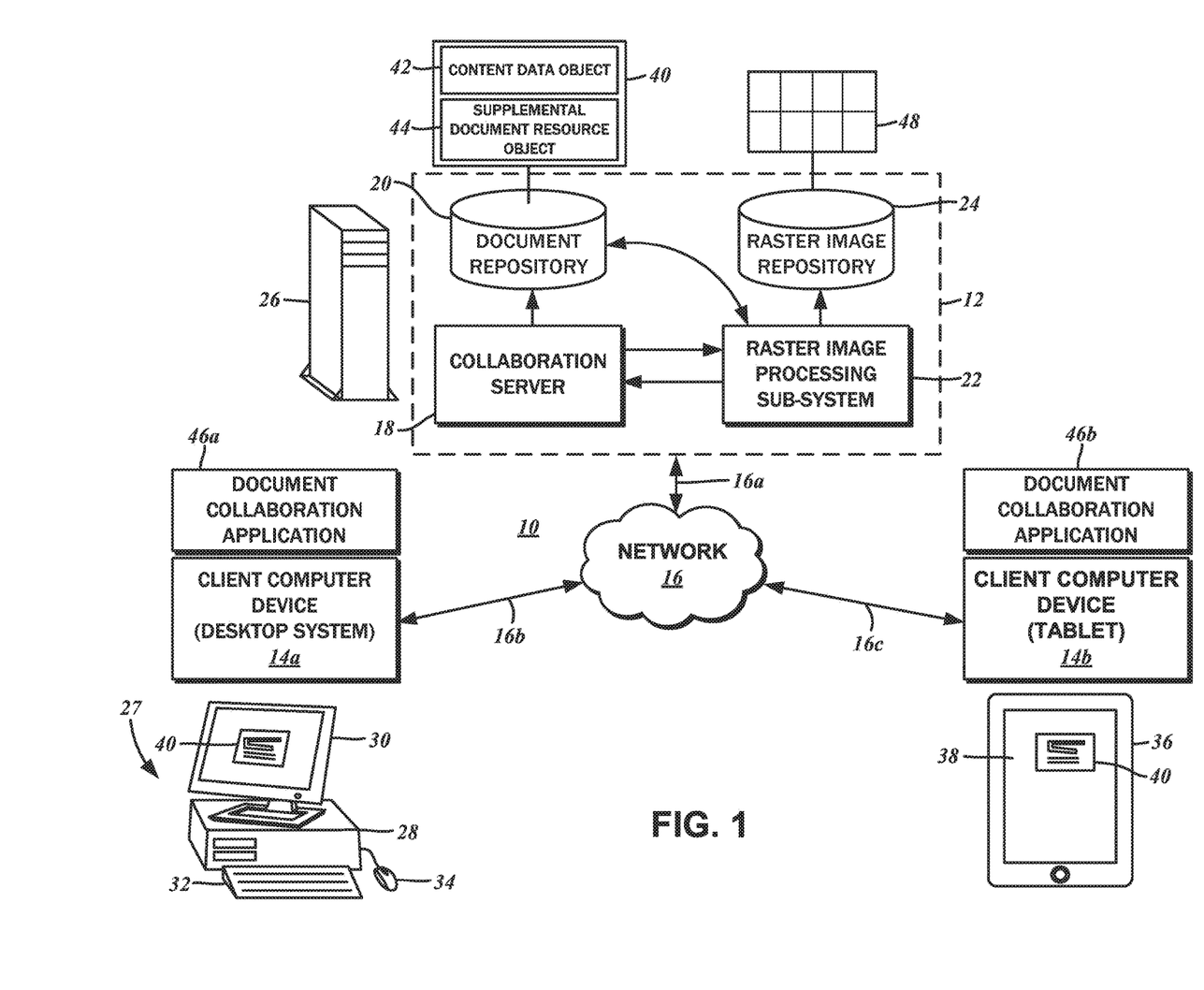
FIG. 1 is a block diagram illustrating an exemplary environment including a collaboration platform and one or more client computer devices.

The block diagram of FIG. 1 shows an exemplary environment 10 in which the various embodiments of the optimized rendering of documents may be implemented. There is a collaboration platform 12 that is in communication with one or more client computer devices 14a-14b over a network 16. It is contemplated that the network 16 interconnects the client computer devices 14 that are remotely located, and thus may be the Internet or other type of wide area network, though local area implementations are also contemplated. Network connections 16a-16c may thus be Internet Protocol Suite-compliant with a Transmission Control Protocol (TCP) component as well as a User Datagram Protocol (UDP) component. Depending on the needs of the services involved, the more reliable and ordered (albeit slower) delivery of data possible through a TCP connection may be more appropriate, or the faster but more unreliable delivery of data through a UDP connection may be more appropriate. Although any network modality may be utilized to transfer data from the client computer devices 14 to the collaboration platform 12 and vice versa, it will be appreciated that certain improvements may be realized if the protocol selection is tailored to the particular needs. Along these lines, the specific network topology is presented by way of example only, however, and any other type of arrangement may be substituted.

The collaboration platform 12 may be separated into several constituent parts, including a collaboration server 18, a document repository 20, a raster image processing sub-system 22, and a raster image repository 24. The functionality of each of these parts will be described in further detail below. According to one embodiment, the collaboration platform 12 may be the Bluebeam Studio product. All of the various parts of the collaboration platform 12 may be implemented on a conventional server computer system 26 having a processor capable of executing the instructions of the contemplated methods, as well as a memory for storing the instructions and other related data. As part of its functionality of communicating with the client computer devices 14 over the network 16 in some embodiments, the collaboration server 18 may be a web server including commercially available application or web services components such as the Windows Communication Foundation (WCF) from Microsoft Corporation of Redmond, Wash.

Alternatively, the collaboration server 18 and the raster image processing sub-system 22 may be implemented on separate hardware devices, and the databases/data repositories may be implemented on yet another separate hardware device. The illustrated division is presented by way of example only and not of limitation, and it will be appreciated by those having ordinary skill in the art that any suitable hardware/functionality implementation may be substituted without departing from the scope of the present disclosure. In this regard, the collaboration platform 12 and the collaboration server 18 will be referred to interchangeably.

A first exemplary embodiment of the client computer device 14a may be a conventional desktop computer system 27 that is generally comprised of a system unit 28, a display device 30, and different input devices. The display device 30 graphically shows output from the data processing operations performed by the system unit 28, which is understood to include a central processing unit, random access memory (RAM), hard disk drives, and so on. Devices such as a keyboard 32 and a mouse 34 are utilized to provide input to the data processing operations, and are connected to the system unit 28 via peripheral interface ports. Other input and output devices may be connected to the system unit 28, including printers, microphones, speakers, and the like may be connected to the system unit 28.

The first client computer device 14a may utilize any operating system having a graphical user interface (GUI), such as WINDOWS from Microsoft Corporation of Redmond, Wash., MAC OS from Apple, Inc. of Cupertino, Calif., various versions of UNIX with the X-Windows windowing system, and so forth. The system unit 28 executes one or more computer programs, with the results thereof being displayed on the display device 30. Generally, the operating system and the computer programs are tangibly embodied in a computer-readable medium, e.g., one or more of the fixed and/or removable data storage devices. Both the operating system and the computer programs may be loaded from the aforementioned data storage devices into RAM for execution by the central processing unit. The computer programs may comprise instructions, which, when read and executed by the central processing unit, cause the same to perform or execute the steps or features of the various embodiments set forth in the present disclosure.

A user can interact with the first client computer device 14a, specifically with the graphics being displayed on the display device 30, via the mouse 34. The movement of a cursor generated on the display device 30 is tied to the movement of the mouse 34, with further interactivity being provided with input from the mouse buttons. Input from the keyboard 32 also provides interactivity with the client computer device 14.

In order to establish the network connection 16b and communicate with other systems connected via the network 16, the first client computer device 14a is understood to include various data communications modalities conforming to, for example, the aforementioned networking standards. More particularly, the first client computer device 14a may include an Ethernet module for wired connections, and/or a WLAN (Wireless LAN) module for wireless connections.

Another second exemplary embodiment of the client computer device 14b may be a tablet 36 that includes a combined touch input display 38. Like the desktop computer system 27, the tablet 36 includes a central processing unit and memory, along with network connectivity components, which are typically limited to wireless modalities for mobility reasons. The touch input display 38 graphically shows output from the data processing operations performed by the central processor, and accepts inputs that are utilized in the data processing operations. Although some tablets 36 can utilize desktop operating systems such as Windows, in many commercial implementations, dedicated mobile operating systems such as Android or iOS that are optimized for the tablet form factor are more common. The tablet 36 may be loaded with computer programs (referred to as apps) comprised of executable instructions that are performed by the processor to implement the various methods of the present disclosure.

The foregoing client computer devices 14a, 14b represent only exemplary apparatuses suitable for implementing aspects of the present invention. As such, the client computer devices 14 may have many different configurations and architectures, and any such configuration or architecture may be readily substituted.

The present disclosure contemplates the optimized rendering of a shared document 40 on multiple client computer devices 14. According to one exemplary embodiment, the document 40 is in a Portable Document Format (PDF) file format that includes text streams, fonts, and graphics (both vector and raster) along with page description/layout information that dictates the presentation of such text and graphics. This data, which is visually rendered on the client computer device 14, may be generally referred to as content data objects 42 and are understood to be conceptual entities corresponding to a contiguous block of memory at a specific location and with a specific size.

The document 40 may also include supplemental document resource objects 44 that are associated with the underlying document 40, such as annotations, bookmarks, hyperlinks, thumbnails, and other such elements that are not a part of the standalone document and hence not a content data object 42. An annotation can be defined by one or more properties that define its visual characteristics when rendered, and include geometric primitives such as points, lines, ellipses, polygons, and so forth, as well as specialized elements such as callout boxes. To further define the features of the annotation, various parameter attributes can be associated therewith such as dimensions, color, line thickness, positioning coordinates, and others that are specific to that annotation type. Bookmarks are understood to reference a specific location within the document or a page in the document, or another document. Hyperlinks are understood to reference other documents or resources, and the activation of which can cause that referenced document to be accessed.

The details of the optimized rendering of the document 40 will be described in terms of the PDF document. However, it will be appreciated that the disclosed features can be adapted to other documents such as word processing documents, spreadsheets, photographs, graphics layouts, three-dimensional models, video, graphical content such as medical X-ray images, and so forth.

Viewing and manipulating the document 40 from the client computer devices 14 typically involve separate applications 46 running thereon. Because the application 46 is specific to the platform/operating system on which it is running, there is a first application 46a for the first client computer device 14a, and there is a second application 46b for the second client computer device 14b. There is a variety of PDF viewing and editing applications on the market for both desktop computers and tablets, and the presently disclosed features may be readily incorporated therein. However, specific applications 46 that can interface directly with the collaboration platform 12 may also be utilized. The applications 46 access the specified document 40 from the collaboration server 18, which may, in turn, retrieve the file from the document repository 20.

As indicated above, the PDF document 40 is comprised of data that, in most instances, requires some level of processing to be displayed as intended, as there are numerous variations in the screen size and resolution. The rendering engine in the application 46 interprets the content data objects 42 and the supplemental document resource objects 44 to generate a display of the document 40 in a manner that is consistent across all client platforms. It is understood that this processing can be resource-intensive, depending on the client computer device 14. A typical desktop computer system 27 has sufficient processing power such that real-time rendering is possible, but this may not be the case for the tablet 36. Without as much computing power and memory resources, rendering the document 40, particularly those including a lot of vector graphics and complex layouts, tablets 36 and other devices with similar capabilities may provide less than ideal performance. Accordingly, the present disclosure contemplates the seamless delivery and rendering of a rasterized representation 48 or bitmap of the document 40 on client computer devices 14 with reduced processing power. As will be recognized by those having ordinary skill in the art, rendering the rasterized representation 48 of the document 40 is less resource-intensive, and can be achieved in real-time, even on devices such as the tablet 36 with slower processor units.

As noted above, various methods for optimizing the rendering of the document 40 are contemplated, including one embodiment that is implemented on the client computer device 14, and another embodiment that is implemented on the collaboration platform 12. It will be recognized that the present disclosure is not intended to be limited to these embodiments, however. The method that is implemented on the client computer device 14 may be embodied as one or more programs of instructions that are executable thereon, and stored on a non-transitory program storage medium readable thereby. Similarly, the method that is implemented on the collaboration platform 12/collaboration server 18 may be embodied as one or more programs of instructions that are executable thereon and stored on a non-transitory program storage medium that is readable thereby.

Figure 2:
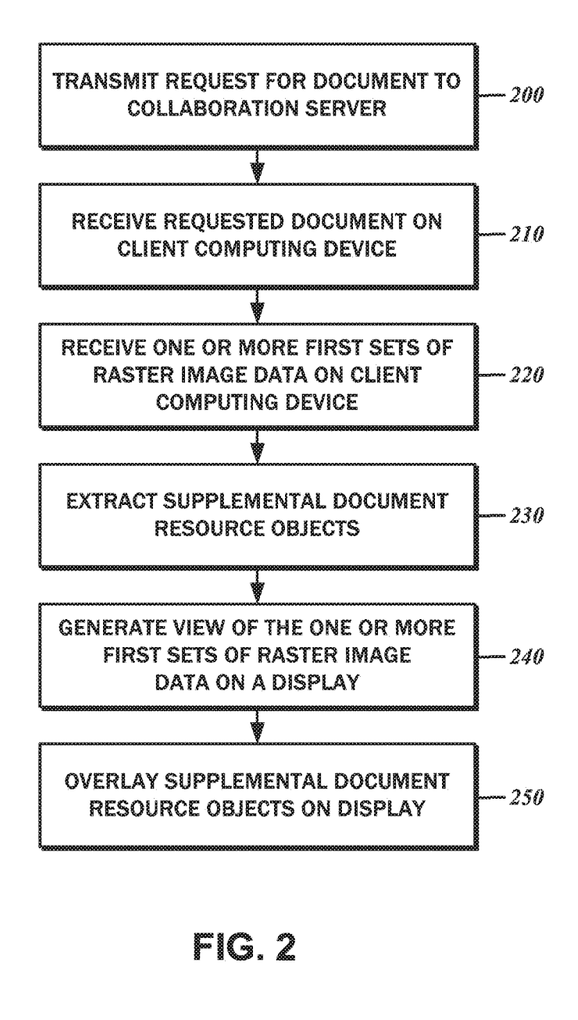
FIG. 2 is a flowchart showing one embodiment of a method for rendering a document on the client computer device as implemented thereon.

With reference to the flowchart of FIG. 2, a method for rendering the document 40 on the client computer device 14, and in particular, the second client computer device 14b or the tablet 36 begins with a step 200 or transmitting a request for the document 40 to the collaboration platform 12, also generally referred to as a remote system. The request may be specifically made to the collaboration server 18, which manages the document 40 that is stored on the document repository 20. The request for the document 40 may take place without user intervention, after the user initially logs in to the collaboration platform 12. The flowchart of FIG. 3 illustrates a method for presenting the document 40, and includes a counterpart step 300 of receiving the request from the client computer device 14.

The request may include a designation of the originating client computer device 14. When it originates from the first client computer device 14a, the designation may indicate to the collaboration server 18 that only the document 40 is needed, as it is capable of rendering the same without placing an undue burden thereon. When it originates from the second client computer device 14b that is, indeed, limited, it may be designated as having a reduced processing/rendering capacity for the content data objects 42. This is envisioned as indicating to the collaboration server 18 that additional data, e.g., the rasterized representation 48 is also being requested. It will be recognized that a limited device capability need not be implied from the designation of the originating client computer device 14 that results in the rasterized representation 48 being provided. Embodiments in which the rasterized representation 48 is requested other than for shortening rendering times despite reduced processing power are expressly contemplated.

Upon receiving the request, and in response thereto in a step 310, the collaboration server 18 transmits the requested document 40 to the client computer device 14. Now referring back to the flowchart of FIG. 2, there is a counterpart step 210 of receiving the document 40 on the client computer device 14. It is contemplated that because the document 40 includes the supplemental document resource objects 44, even if the client computer device 14 does not end up using or needing the content data objects 42, it is nevertheless transmitted thereto.

Figure 3:
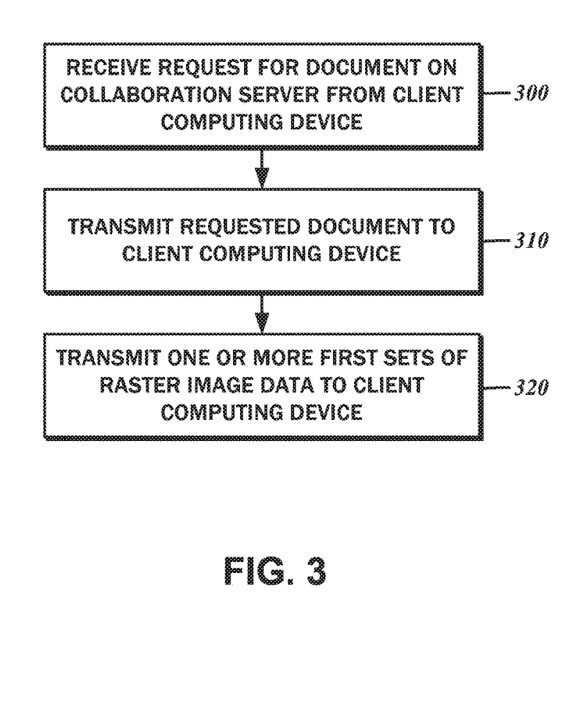
FIG. 3 is a flowchart showing an embodiment of a method for presenting the document to a client computer device as implemented on the collaboration platform.

Either simultaneously, subsequently, or previously to the steps of transmitting/receiving the document 40, the method for presenting the document 40 as depicted in the flowchart of FIG. 3 includes a step 320 of selectively transmitting the rasterized representation 48 to the client computer system 14. Thus, the step of transmitting/receiving the document 40, and the step of transmitting/receiving the rasterized representation 48 are understood to be independent of each other. One embodiment contemplates the rasterized representation 48 being stored on the raster image repository 24 that is separate from the document repository 20, as shown in FIG. 1. In this case, the client computer device 14 requests the document 40, and then the collaboration server 18, recognizing that the rasterized representation 48 as well as the document 40 is being requested, relays this request to the raster image processing sub-system 22. The requested rasterized representation 48 is retrieved from the raster image repository 24, and is passed back to the collaboration server 18 for transmission to the client computer device 14. This is only one possible way in which the rasterized representation 48 can be provided to the client computer device 14. For instance, it may also be possible to store both the document 40 and its rasterized representation 48 on a single data storage system. Those having ordinary skill in the art will be readily recognize such alternative arrangements, and are therefore deemed to be within the scope of the present disclosure.

In the method for rendering the document 40 as shown in the flowchart of FIG. 2, there is a counterpart step 220 of receiving the rasterized representation 48. As will become more apparent, the rasterized representation 48 may also be referred to as one or more first sets of raster image data. Each of the first sets of raster image data is understood to be representative of a specific segment of the document 40, and has a first predefined resolution.

Because of the relatively lower processing power requirements associated with rendering a bitmap, the presentation thereof on the tablet 36 is contemplated to achieve substantial performance improvements with reduced delays, and smoother visualizations and interaction. Furthermore, since the desktop computer system 27 can adequately render the document 40 without degradation in performance, the rasterized representation 48 is understood to be unnecessary. The decision of whether or not to transmit the rasterized representation 48 may be made by the collaboration server 18 based upon the identification of the particular client computer device 14 included in the request for the document 40, as described above. In other words, the collaboration server 18/collaboration platform 12 recognizes when the client computer device 14a with adequate rendering capability has requested the document 40, and when the client computer device 14b without adequate rendering capability has done the same. In the latter case, the collaboration server 18 retrieves the rasterized representation 48 from the raster image repository 24 automatically without further user intervention.

Figure 4A:
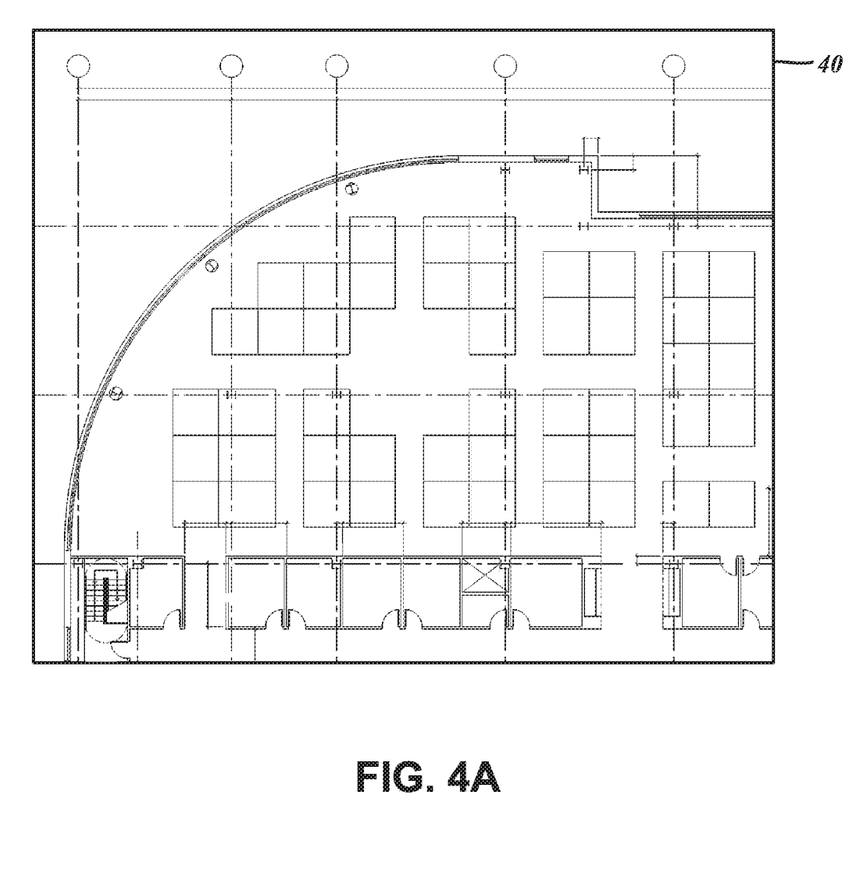
FIGS. 4A-4C illustrate the segmentation of the document into sets of raster image data according to one embodiment of the present disclosure.
Figure 4B:
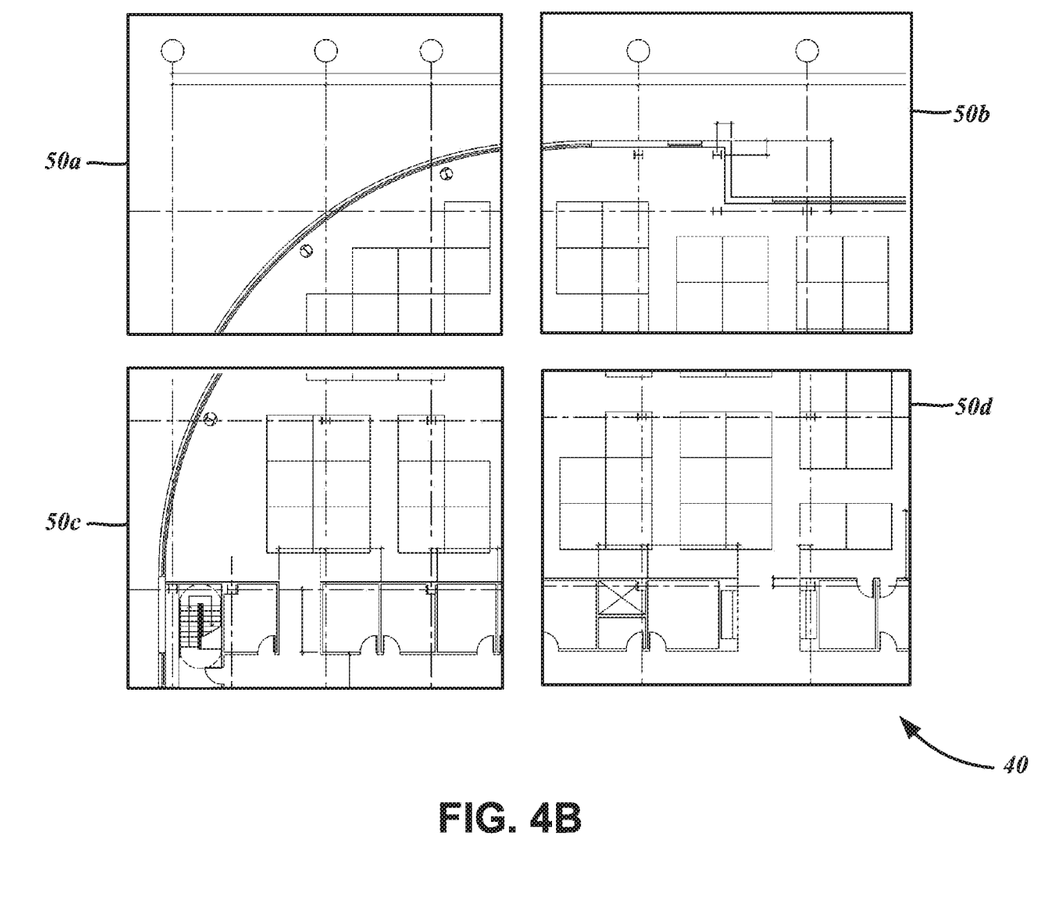

FIG. 4A illustrates an example of the document 40 that includes numerous vector graphic elements such as lines, arcs, and so forth. As indicated above, from one page of the document 40, multiple sets of raster image data are generated, each set corresponding to a different section of the page. FIG. 4B shows that in one embodiment, the page is segregated into four separate subsections, including a first subsection 50a, a second subsection 50b, a third subsection 50c, and a fourth subsection 50d. Each of these subsections, while being referred to as a set of raster image data, may also be referred to as tiles. One set of tiles, or rasterized representations 48 of the document 40, are generated at a first resolution. This is so that panning and other interactions can take place across the entirety of the page without delay at that resolution or zoom level. Another set of tiles may be generated at a different second resolution that may provide a better overview of the entirety of the page.

Each of the tiles may be generated based upon a determination of page pixel width and a page pixel height. In further detail, although any unit of measure may be utilized, a page width in inches multiplied by a standard dots-per-inch (DPI) setting of the document, e.g., 72 DPI for documents rendered on a screen, corresponds to the page pixel width. Furthermore, a page height in inches multiplied by the standard 72 DPI corresponds to the page pixel height. For example, with a 36" by 24" page, the page pixel width is 2592, while the page pixel height is 1728. The larger value of the page pixel width or the page pixel height is understood to be a page pixel dimension. Continuing with the example, because the example page pixel width of 2592 is greater, it is established as the page pixel dimension. Next, a scaling factor is determined based upon the page pixel dimension and a predetermined tile pixel dimension. The tile pixel dimension can be any value optimized for the target display device, but in one exemplary embodiment, it is 1024 by 1024 pixels. The scaling factor is evaluated from dividing the tile pixel dimension by the page pixel dimension, which in the illustrated example, is 0.395.

Figure 5:
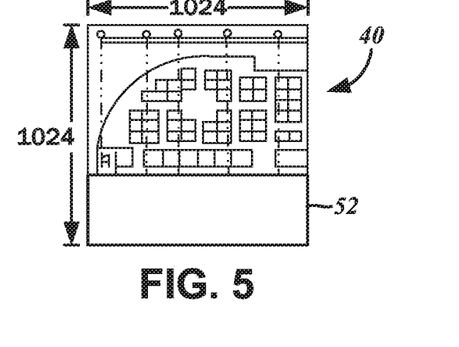
FIG. 5 shows an example of the document rasterized at one predefined resolution.

Rasterizing the page with this page pixel dimension yields an entire page of the document 40 fitting within one tile of the tile pixel dimension width and height, e.g., 1024 by 1024 pixels. An example of this scaling/rasterizing is shown in FIG. 5. The actual width of the content area is understood to be 1024 by 683 pixels. This is understood to represent the 1× zoom tile 52. The first predefined resolution may thus be based upon scaling a single one of the one or more first sets of raster image data.

Figure 6:
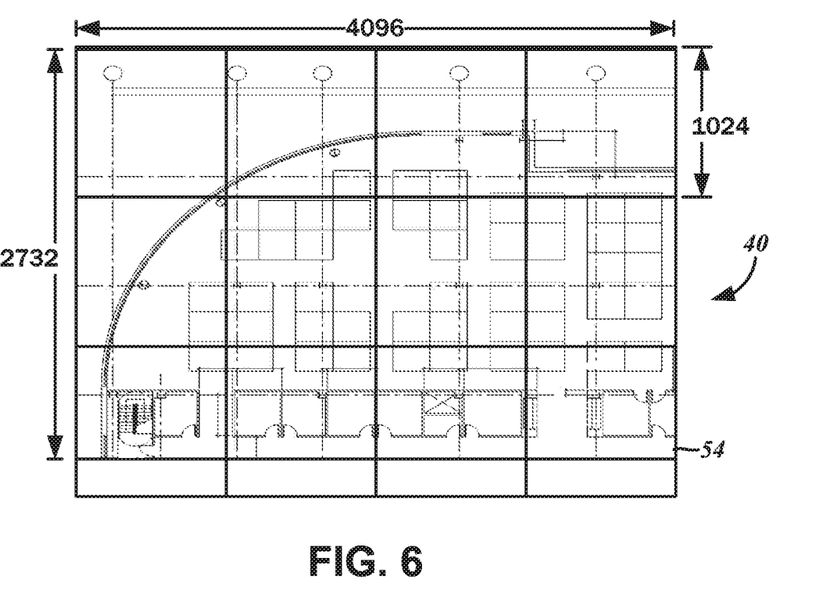
FIG. 6 shows another example of the document rasterized at another predefined resolution.

A 4× zoom factor may also be set, with appropriate tiles generated therefrom. This simply involves the multiplication of the aforementioned page pixel dimension, e.g., 0.395 by 4, which yields a single image of 4096 by 2732 pixels. This image is then segregated into individual 1024 by 1024 pixel tiles, as shown in FIG. 6. In one implementation, the page is separated into at most sixteen tiles, though this is by way of example only and not of limitation. Continuing with the example, based on the dimensions of the image, there are four tiles across and three tiles down for a total of twelve tiles 54, each of which correspond to the aforementioned first sets of raster image data. This second set of raster image data may be generated based upon a second predefined resolution different from the first predefined resolution.

Figure 4C:
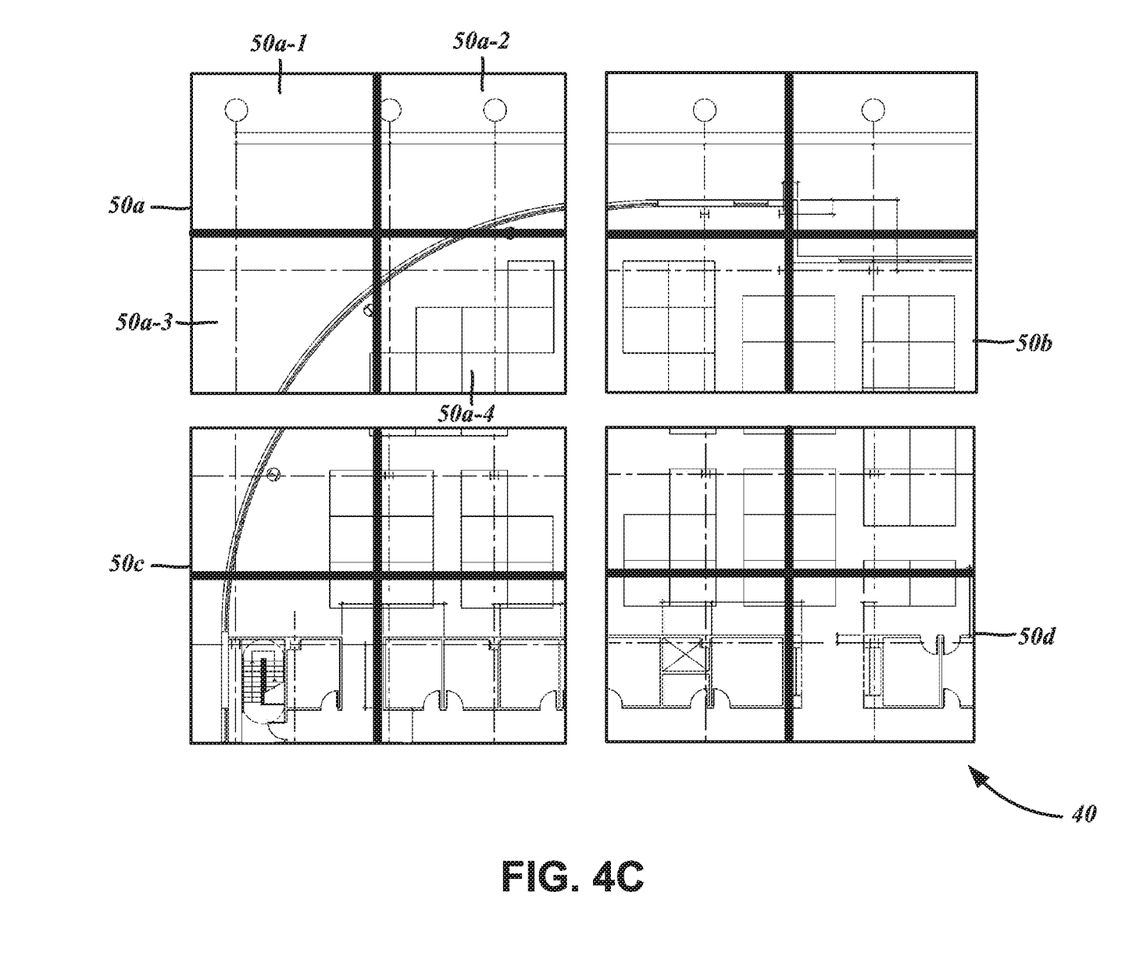

The specific resolution or zoom level depends on the actual size of the page of the document as will be described in further detail below. To the extent the document 40 needs to be divided further because of its large size, as shown in FIG. 4C, the subsections 50*a*-*d* may be further divided into additional subsections thereof, including subsection 50*a*-1, 50*a*-2, 50*a*-3, and 50*a*-4 within the first subsection 50*a*.

In one exemplary embodiment, the rasterized representation 48 of the document 40, that is, the sets of raster image data or tiles, is generated prior to the request therefor from the client computer device 14. This can include periodic batch processing of documents 40 known to be accessed by the second client computer device 14*b* that needs such rasterized representation 48. A variety of modalities of tracking this are contemplated, including adding a flag that a less capable, second client computer device 14*b* has accessed the document 40 in the past. Upon an initial access from the tablet 36, the collaboration server 18 may generate a request to the raster image processing sub-system 22 that effectively primes the rasterized representation 48.

Returning to the flowchart of FIG. 2, once the second client computer device 14*b* has received both the document 40 and the rasterized representations 48, the method may continue with a step 230 of extracting the supplemental document resource objects 44, e.g., annotations, from the document 40. Additionally, according to a step 240, a view of the one or more first sets of raster image data, that is, the rasterized representation 48 of the document 40, is generated on the touch input display 38 of the second client computer device 14*b*

Figure 7:
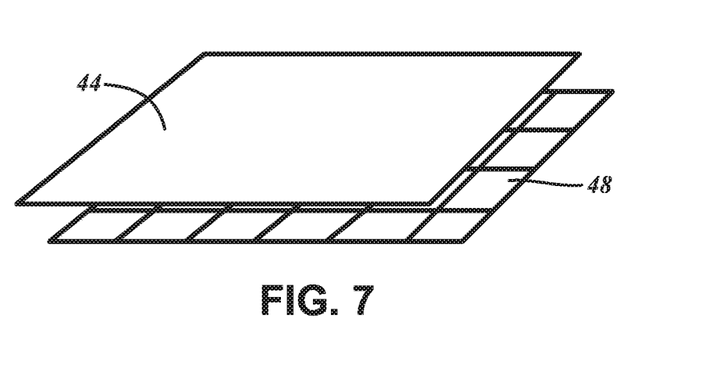
FIG. 7 shows an example of a layer of supplemental document resource objects from the document overlaid on a view of the raster image data thereof.

The content data objects 42 are not loaded or rendered when the rasterized representation 48 has been received. The application 46*b* running on the second client computer device 14*b*, e.g., the tablet 36, may be configured to recognized that when the rasterized representation 48 is received, the display thereof proceeds by default, rather than attempting to render the vector data of the document 40 at a detriment to performance. Per step 250, the one or more supplemental document resource objects 44 from the document 40 are overlaid on the view of the rasterized representation 48. As shown in FIG. 7, the view includes the base rasterized representation 48, above which there is another layer for the supplemental document resource objects 44. The positioning of each of the supplemental document resource objects 44 is understood to be in accordance with corresponding document location attributes thereof, such as coordinates and layer designations.

Having considered the various features of presenting the document 40 on the client computer device 14, additional features pertaining to editing and updating functions will now be described. In accordance with the embodiments of the collaboration platform, when an annotation is added, e.g., a supplemental document resource object 44 is appended to the document 40 from one of the client computer devices 14, when the underlying document is modified in some way, e.g., a content data object 42 is added, deleted, or revised, or more generally, when any aspect of the document 40 is changed, that change is first reflected in the local version of the document 40, then propagated to the other versions residing on remote client computer devices 14 via the collaboration platform.

With respect to the corresponding rasterized representation 48, if the collaboration server 18 has tracked prior access to the document 40 by the second client computer device 14*b* with the reduced rendering capacity, then an updated version of the rasterized representation 48 can be generated in the same manner as discussed above. In some embodiments, updates to the document 40 are not pushed, and only propagated when the client-side requests the updates in a pull operation. However, in some cases when the client computer device 14 is participating in an active collaboration session, it is possible to push the update to the document 40, along with the corresponding rasterized representation 48 thereof.

When any document-level modification is made on the tablet 36, that is, the client computer device 14 that uses the rasterized representation 48, it is possible to switch over to rendering the document 40, though with attendant reductions in performance. These modifications include page rotations, page insertions, page reordering, page deletions, layer and markup flattening, and so forth, which makes the retrieved and displayed rasterized representation 48 outdated. Additionally, when the client computer device 14 is unable to access the rasterized representation 48 from the collaboration platform 18, a similar switchover takes place. The transition is understood to be seamless and requires no user intervention. Indeed, the user is not notified at all of the transition. In any case, display of the most updated and valid version of the document 40 can be assured.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A method for presenting a document stored on a server to a client computer device, the method comprising:

generating a first set of tiles by dividing the document into a plurality of subsections of same dimensions, each tile comprising a rasterized representation of a subsection of the plurality of subsections, and the document comprising one or more sets of content data objects and one or more supplemental document resource objects;

receiving a request for the document from the client computer device, the request comprising an identification of the client computer device;

determining a performance metric of the client computer device representing at least a processing capacity of the client computer device based on the request;

upon determining the performance metric of the client computer device indicates that the client computer device has reduced processing capacity for rendering the document, transmitting the document and the first set of tiles to the client computer device, enabling the client computer device to generate a view of the document using the first set of tiles and the one or more supplemental document resource objects of the document; and upon determining the performance metric of the client computer device indicates that the client computer device does not have reduced processing capacity for rendering the document, transmitting the document to the client computer device and retaining the first set of tiles at the server, enabling the client computer device to render the document, wherein generating the view of the document using the first set of tiles and the one or more supplemental document resource objects of the document requires less processing power than rendering the document.

2. The method of claim 1, wherein the request includes a designation of the performance metric of the client computer device as having reduced rendering processing capacity for rendering the document.

3. The method of claim 1, wherein the first set of tiles is generated prior to receiving the request for the document from the client computer device.

4. The method of claim 1, wherein the first set of tiles and the document are stored on the server.

5. The method of claim 1, wherein each of the first set of tiles has a first predefined resolution.

6. The method of claim 5, further comprising:
transmitting a second set of tiles to the client computer device, each of the second set of tiles being representative of a subsection of the document and having a second predefined resolution different from the first predefined resolution of the first set of tiles.

7. The method of claim 6, wherein the second predefined resolution is based upon scaling each of the second set of tiles for one page of the document to a display on the client computer device.

8. The method of claim 1, further comprising:
receiving an update to the document from the client computer device;
applying the update to the document stored on the server; and
generating an updated first set of tiles on the server, each of the updated first set of tiles being representative of a subsection of an updated version of the document with the applied update.

9. The method of claim 8, further comprising:
transmitting the updated first set of tiles to the client computer device.

10. The method of claim 1, wherein generating a view of the document using the first set of tiles and the one or more supplemental document resource objects of the document comprises, upon transmitting the document and the first set of tiles to the client computer device, rendering, by the client computer device, the first set of tiles on a display.

11. The method of claim 10, wherein generating a view of the document using the first set of tiles and the one or more supplemental document resource objects of the document further comprises, upon the client computer device rendering the first set of tiles on the display, rendering, by the client computer device, the one or more supplemental document resource objects on the display.

12. The method of claim 1, wherein rendering the document comprises, upon transmitting the document to the client computer device and retaining the first set of tiles at the server, rendering, by the client computer device, the one or more sets of content data objects and the one or more supplemental document resource objects on a display.

13. A system for presenting a document stored on a server to a client computer device, the system comprising:
one or more processors; and
at least one non-transitory computer readable medium storing instructions that, when executed by the one or more processors, cause the one or more processors to perform operations comprising:
generating a first set of tiles by dividing the document into a plurality of subsections of same dimensions, each tile comprising a rasterized representation of a subsection of the plurality of subsections, and the document comprising one or more sets of content data objects and one or more supplemental document resource objects;
receiving a request for the document from the client computer device, the request comprising an identification of the client computer device;
determining a performance metric of the client computer device representing at least a processing capacity of the client computer device based on the request;
upon determining the performance metric of the client computer device indicates that the client computer device has reduced processing capacity for rendering the document, transmitting the document and the first set of tiles to the client computer device, enabling the client computer device to generate a view of the document using the first set of tiles and the one or more supplemental document resource objects of the document; and
upon determining the performance metric of the client computer device indicates that the client computer device does not have reduced processing capacity for rendering the document, transmitting the document to the client computer device and retaining the first set of tiles at the server, enabling the client computer device to render the document,
wherein generating the view of the document using the first set of tiles and the one or more supplemental document resource objects of the document requires less processing power than rendering the document.

14. The system of claim 13, where the operations further comprise:
receiving an update to the document from the client computer device;
applying the update to the document stored on the server; and
generating an updated first set of tiles on the server, each of the updated first set of tiles being representative of a subsection of an updated version of the document with the applied update.

15. The system of claim 14, wherein the operations further comprise:
transmitting the updated first set of tiles to the client computer device.

16. The system of claim 13, wherein generating a view of the document using the first set of tiles and the one or more supplemental document resource objects of the document comprises, upon transmitting the document and the first set of tiles to the client computer device, rendering, by the client computer device, the first set of tiles on a display.

17. The system of claim 16, wherein generating a view of the document using the first set of tiles and the one or more supplemental document resource objects of the document further comprises, upon the client computer device rendering the first set of tiles on the display, rendering, by the client computer device, the one or more supplemental document resource objects on the display.

18. A non-transitory computer readable medium storing instructions that, when executed by one or more processors, cause the one or more processors to perform operations for presenting a document stored on a server to a client computer device, the operations comprising:

generating a first set of tiles by dividing the document into a plurality of subsections of same dimensions, each tile comprising a rasterized representation of a subsection of the plurality of subsections, and the document comprising one or more sets of content data objects and one or more supplemental document resource objects;

receiving a request for the document from the client computer device, the request comprising an identification of the client computer device;

determining a performance metric of the client computer device representing at least a processing capacity of the client computer device based on the request;

upon determining the performance metric of the client computer device indicates that the client computer device has reduced processing capacity for rendering the document, transmitting the document and the first set of tiles to the client computer device, enabling the client computer device to generate a view of the document using the first set of tiles and the one or more supplemental document resource objects of the document; and upon determining the performance metric of the client computer device indicates that the client computer device does not have reduced processing capacity for rendering the document, transmitting the document to the client computer device and retaining the first set of tiles at the server, enabling the client computer device to render the document, wherein generating the view of the document using the first set of tiles and the one or more supplemental document resource objects of the document requires less processing power than rendering the document.

19. The non-transitory computer readable medium of claim 18, wherein each of the first set of tiles has a first predefined resolution.

20. The non-transitory computer readable medium of claim 19, wherein the operations further comprise:

transmitting a second set of tiles to the client computer device, each of the second set of tiles being representative of a subsection of the document and having a second predefined resolution different from the first predefined resolution of the first set of tiles.

* * * * *

UNITED STATES PATENT AND TRADEMARK OFFICE
CERTIFICATE OF CORRECTION

PATENT NO. : 11,120,197 B2
APPLICATION NO. : 16/525937
DATED : September 14, 2021
INVENTOR(S) : Rothberg et al.

Page 1 of 1

It is certified that error appears in the above-identified patent and that said Letters Patent is hereby corrected as shown below:

In the Claims

In Column 13, Line 10, in Claim 2, after "reduced" and before "processing," delete the term "rendering."

Signed and Sealed this
Eighth Day of February, 2022

Drew Hirshfeld
*Performing the Functions and Duties of the
Under Secretary of Commerce for Intellectual Property and
Director of the United States Patent and Trademark Office*